US011286888B2

United States Patent
Zito et al.

(10) Patent No.: US 11,286,888 B2
(45) Date of Patent: Mar. 29, 2022

(54) INTERNAL COMBUSTION ENGINE PROVIDED WITH A WATER-BASED OPERATING LIQUID FEEDING SYSTEM HAVING A HEATING DEVICE

(71) Applicant: MARELLI EUROPE S.p.A., Corbetta (IT)

(72) Inventors: Antonio Zito, Bologna (IT); Antonio Barbuto, Bologna (IT)

(73) Assignee: MARELLI EUROPE S.p.A., Corbetta (IT)

( * ) Notice: Subject to any disclaimer, the term of this patent is extended or adjusted under 35 U.S.C. 154(b) by 0 days.

(21) Appl. No.: 17/065,616

(22) Filed: Oct. 8, 2020

(65) Prior Publication Data
US 2021/0140393 A1 May 13, 2021

(30) Foreign Application Priority Data

Oct. 11, 2019 (IT) .................. 102019000018542

(51) Int. Cl.
*F02M 25/022* (2006.01)
*F01N 5/02* (2006.01)
*F01N 13/10* (2010.01)
*F02M 25/03* (2006.01)
*F28F 13/06* (2006.01)

(52) U.S. Cl.
CPC .......... *F02M 25/0224* (2013.01); *F01N 5/02* (2013.01); *F01N 13/10* (2013.01); *F02M 25/0222* (2013.01); *F02M 25/0227* (2013.01); *F02M 25/03* (2013.01); *F28F 13/06* (2013.01)

(58) Field of Classification Search
CPC .................................. F01N 13/10; F01N 5/02
See application file for complete search history.

(56) References Cited

U.S. PATENT DOCUMENTS

2014/0116404 A1* 5/2014 Piper .................. F02M 25/0222
123/568.12

FOREIGN PATENT DOCUMENTS

| CN | 109322729 A | | 2/2019 |
| JP | 2004270609 A | * | 9/2004 |
| WO | 2008006608 A1 | | 1/2008 |
| WO | 2016150599 A1 | | 9/2016 |

OTHER PUBLICATIONS

Search Report for Italian Application No. 201900018542 dated Jul. 16, 2020.

* cited by examiner

*Primary Examiner* — Kevin A Lathers
(74) *Attorney, Agent, or Firm* — Howard & Howard Attorneys PLLC

(57) ABSTRACT

An internal combustion engine having an exhaust duct through which pass exhaust gases; and a water-based operating liquid system which includes a tank, and a heating device, which is coupled to the tank and is designed to heat water-based operating liquid. The heating device includes a heating chamber having an inlet opening designed to receive ambient air and that allows heat to be transferred from the walls of the exhaust duct to the air received from the environment and comprises an outlet opening for the heated air; and a heat exchanger, which receives the heated air and is thermally coupled to the tank so as to release part of the heat of the heated air to the water-based operating liquid contained in the tank.

14 Claims, 4 Drawing Sheets

INTERNAL COMBUSTION ENGINE PROVIDED WITH A WATER-BASED OPERATING LIQUID FEEDING SYSTEM HAVING A HEATING DEVICE

CROSS-REFERENCE TO RELATED APPLICATIONS

This Patent Application claims priority from Italian Patent Application No. 102019000018542 filed on Oct. 11, 2019, the entire disclosure of which is incorporated herein by reference.

TECHNICAL FIELD

The invention relates to an internal combustion engine provided with a feeding system having a heating device.

The invention finds advantageous application in an internal combustion engine provided with a system feeding demineralised water to be injected into the combustion chambers, to which explicit reference will be made in the description below without because of this losing in generality.

PRIOR ART

As it is known, when dealing with internal combustion engines, manufacturers suggested feeding demineralised water, in addition to fuel, into the combustion chambers defined inside the cylinders.

In an internal combustion engine, the water injection system consists of introducing water into the engine through the intake duct, in the form of spray or mixed with fuel, or directly into a combustion chamber, so as to cool the air/fuel mixture, thus increasing the resistance to knock phenomena. Water has a high latent heat of vaporization; in other words, it requires a lot of energy to shift from the liquid state to the gaseous state. When water at ambient temperature is injected into the intake duct, it absorbs heat from the air flowing in and from the metal walls, evaporating, thus cooling the substance flowing in. Hence, the engine takes in fresher air, in other words thicker air, the volumetric efficiency is improved and the knock possibility is reduced, furthermore more fuel can be injected.

During the compression, the water present in very small drops evaporates and absorbs heat from the air being compressed, cooling it down and lowering the pressure thereof.

After the compression, the combustion takes place and there is a further beneficial effect: during the combustion, a lot of heat develops, which is absorbed by the water, reducing the peak temperature of the cycle and reducing, as a consequence, the formation of Nox and the heat to be absorbed by the walls of the engine. This evaporation further transforms part of the heat of the engine (which would otherwise be wasted) into pressure, resulting from the vapour that was formed, thus increasing the thrust upon the piston and also increasing the flow of energy into a possible turbine of the exhaust (the turbine, furthermore, would benefit from the decrease in the temperature of the exhaust gases due to the absorption of heat by the additional water).

The water feeding system comprises a tank, which is filled with demineralised water (in order to avoid the formation of scaling). The tank is normally filled from the outside of the vehicle or it could be filled using the condensate of the air conditioning system, exploiting the condensate of the exhaust or also conveying rain water. Furthermore, the tank is generally provided with an electric heating device (namely, provided with a resistance generating heat through Joule effect when it is flown through by an electric current), which is used to melt possible ice when the temperature on the outside is particularly low.

A heating device is needed, which is simple and economic to be manufactured and is efficient in terms of energy (namely, ensures energy consumptions that are as low as possible).

DESCRIPTION OF THE INVENTION

The object of the invention is to provide an internal combustion engine provided with a water-based operating liquid feeding system having a heating device, which is efficient in terms of energy and, at the same time, is simple and economic to be manufactured.

According to the invention, there is provided an internal combustion engine provided with a water-based operating liquid feeding system having a heating device according to the appended claims.

The appended claims describe embodiments of the invention and form an integral part of the description.

BRIEF DESCRIPTION OF THE DRAWINGS

The invention will now be described with reference to the accompanying drawings, showing a non-limiting embodiment thereof, wherein.

PREFERRED EMBODIMENTS OF THE INVENTION

Figure 1:
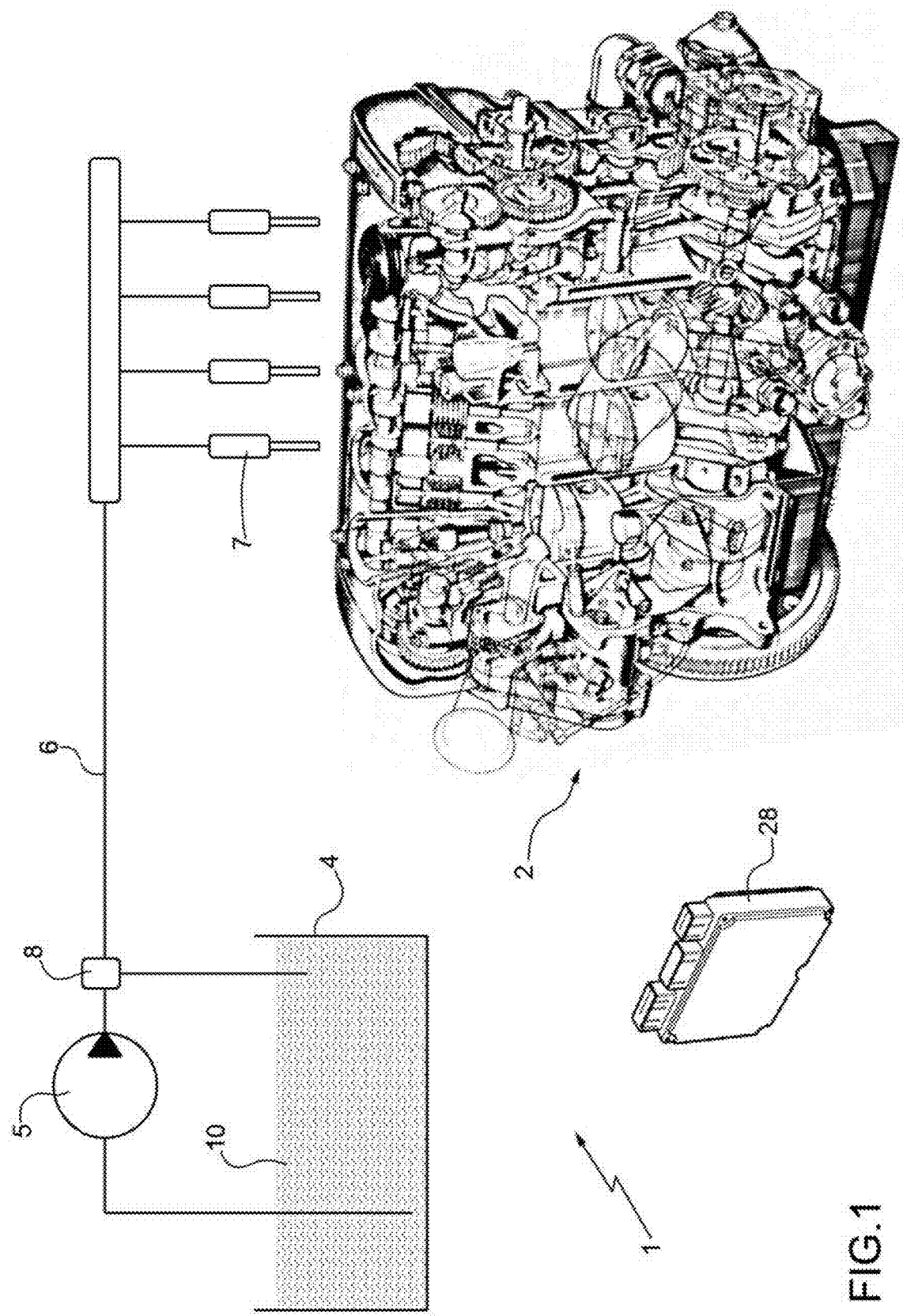
FIG. 1 is a schematic view of an internal combustion engine provided with a system feeding water to at least one combustion chamber.

In FIG. 1, number 1 indicates, as a whole, a system for feeding a water-based operating liquid 10 (in particular, demineralised water) in an internal combustion heat engine 2; the water-based operating liquid 10 is intended to reach the combustion chambers obtained in the cylinders of the internal combustion heat engine 2 in order to increase the efficiency of the combustion and/or increase the power generated.

In the combustion chamber of each cylinder, following the combustion, exhaust gases 11 are generated, which are conveyed through an exhaust duct 3 (which is partially and schematically shown in FIGS. 2-4) so as to be released into the atmosphere after having been properly treated (for example in a catalytic converter).

The feeding system 1 comprises a tank 4 containing a mass of the water-based operating liquid 10 and a pump 5, which draws the water-based operating liquid 10 from the inside of the tank 4 and transfers it, under pressure, to a feeding duct 6. A plurality of injectors 7 are connected to an end portion of the feeding duct 6 and inject the water-based operating liquid 10 at a low pressure into corresponding intake ducts, through which fresh air is conveyed towards the cylinders. According to another embodiment, the injectors 6 could inject the water-based operating liquid 10 at a high pressure directly into the cylinders (in this case, a further high-pressure pump is generally provided).

According to a further embodiment, the water-based operating liquid 10 fed by the feeding system 1 is mixed with the fuel injected into the cylinders.

Along the feeding duct 6 and immediately downstream of the pump 5 there is a maximum pressure valve 8, namely a valve that opens in order to re-introduce the excess water-based operating liquid 10 into the tank 4 when the pressure inside the feeding duct 6 exceeds a predetermined threshold value; basically, the maximum pressure valve 8 operates like a pressure regulator so as to prevent the pressure inside the feeding duct 6 from exceeding the predetermined threshold value. According to an alternative an perfectly equivalent embodiment, a pressure sensor (not shown) is arranged downstream of the pump 5 (for example in a common rail to which the injectors 7 are connected) and the flow rate of the pump 5 is adjusted with a feedback control so as keep the pressure downstream of the pump 5 in the neighbourhood of a desired value (which can also be variable based on the engine point); in this embodiment, the maximum pressure valve 8 is absent or is present only because of safety reasons (namely, it starts acting only in case of control errors or in case of faults).

According to FIG. 2, the feeding system 1 comprises a heating device 9, which is coupled to the tank 4 as well as to the exhaust duct 3 and operates in the ways described below in detail.

The heating device 9 comprises a heating chamber 12, which surrounds a portion of the exhaust duct 3 and comprises an inlet opening 13, which is designed to receive air from the outside, and an outlet opening 14, which is arranged higher than the inlet opening 13. The circulation of air through the heating chamber 12 can be obtained through a simple convective motion, also exploiting the pressure generated by the motion of the vehicle, and/or with the aid of a fan or of a motor-driven aspirator. The heating chamber 12 is normally made of a metal material, so that it can bear the temperatures of the exhaust duct 3.

The portion of the exhaust duct 3 located inside the heating chamber 12 heats the air flowing through the heating chamber 12; besides, the exhaust duct 3 is made of a metal material, hence having a high heat conductivity, and, as a consequence, there is a high transmission of heat from the walls of the exhaust duct 3 to the air flowing through the heating chamber 12. The air heated by so doing is caused to flow towards the outlet opening 14 of the heating chamber 1.

The heating device 9 further comprises a heat exchanger 15, which is connected to the outlet opening 14 f the heating chamber 12 by means of a feeding duct 16 and is thermally coupled to the tank 4 (namely, is capable of releasing heat to the tank 4).

Figure 2:
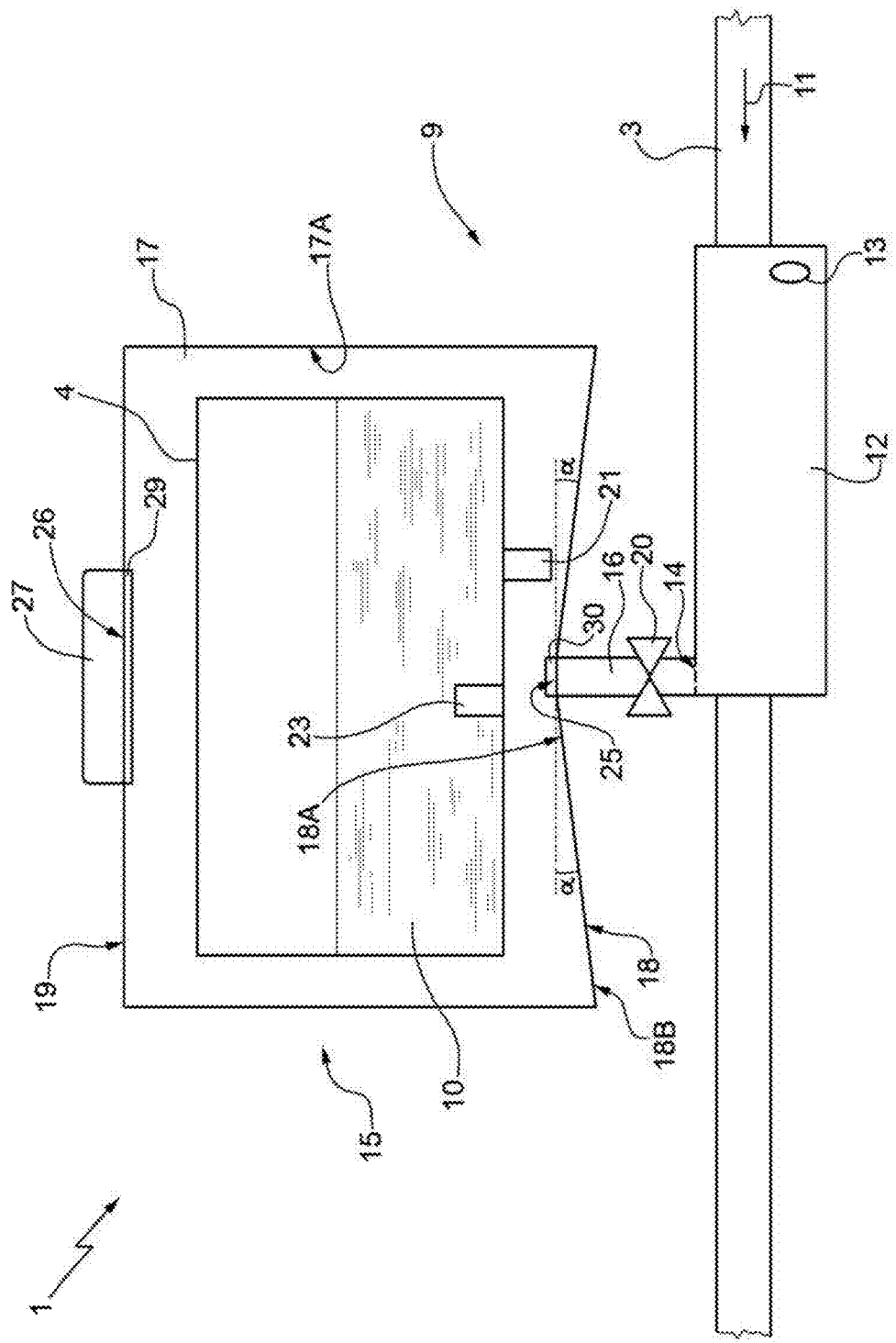
FIG. 2 is a schematic view of a heating device of the feeding system of FIG. 1.

According to the embodiment shown in FIG. 2, the heat exchanger 15 comprises a wrapping body 17, which is hollow on the inside so as to contain, on the inside, the tank 4; namely, the wrapping body 17 comprises a cavity 17A housing the tank 4. In particular, the wrapping body 17 has a lower surface 18 and an upper surface 19, the latter being opposite and arranged higher than the lower surface 18. The lower surface 18 is inclined at an angle α, for example equal to 10-20°; furthermore, the lower surface 18 has an area 18A, which is connected to the feeding duct 16 by means of an inlet opening 25, and an area 18B, which is distal from the inlet opening 25 and is arranged lower than the area 18A.

The wrapping body 17 completely wraps the tank 4 and is configured to receive the heated air in the area of the inlet opening 25. In other words, in use, by exploiting the upward motion (in particular, from the heating chamber 12 to the wrapping body 17) of the heated air through the feeding duct 16, the wrapping body 17 receives the heated air; in this way and thanks to the fact that the tank 4 is arranged inside the wrapping body 17, the heated air hits the tank 4 and, therefore, there is a heat exchange between the heated air (which cools down) and the water-based operating liquid 10 (which heats up) contained in the tank 4.

The area 18B of the lower surface 18 is arranged lower than the area 18A of the lower surface 18 and, hence, possible condensate water generated during the heat exchange between the heated air and the water-based operating liquid 10 gathers, through gravity, in the area 18B of the lower surface 18 (which, thus, acts as condensate water collecting area, keeping the condensate water away from an inlet opening 25 located in the area 18A of the lower surface 18).

The lower surface 18 preferably comprises a plurality of through holes (not shown), which are configured to cause possible condensate water to flow away.

The heating device 9 further comprises an adjustment valve 20, which is interposed between the heating chamber 12 (in particular, the outlet opening 14) and the heat exchanger 15 (in particular, the inlet opening 25) along the feeding duct 16 and is designed to adjust the flow of heated air between the heating chamber 12 and the heat exchanger 15. In particular, the opening and the closing of the adjustment valve 20 are regulated by a control unit 28 (which is schematically shown in FIG. 1) in the ways described in detail below.

The heating device 9 further comprises a temperature sensor 21, which is arranged inside the wrapping body 17 and is configured to detect the temperature of the heated air present inside the wrapping body 17 after having flown in through the inlet opening 25. The temperature sensor 21 is preferably arranged close to the inlet opening 25.

The heating device 9 further comprises a temperature sensor 23, which is arranged in the tank 4 in contact with the water-based operating liquid 10 and is configured to determine the temperature of the water-based operating liquid 10.

According to an embodiment, in use, the control unit 28 adjusts a degree of opening of the feeding valve 20 based on the temperature measured by the temperature sensor 23, both to prevent ice from forming or to melt possible ice present in the tank 4 and to subject the water-based operating liquid 10 contained in the tank 4 to a thermal treatment aimed at avoiding the proliferation of micro-organisms (as described more in detail below). Generally speaking, the control unit 28 avoids heating the water-based operating liquid 10 in the tank 4 at temperatures above 85-90° C. (so as not to damage the components of the tank 4, which are generally made of a plastic material). In other words, in use, the control unit 28 operates a feedback control acting upon the degree of opening of the feeding valve 20 based on the difference between a desired temperature of the water contained in the tank 4 and an actual temperature (measured by the temperature sensor 23) of the water-based operating liquid 10 in the tank 4.

According to another embodiment, which is alternative or additional to the previous one, the control unit 28 adjusts a degree of opening of the feeding vale 20 (also) based on the temperature measured by the temperature sensor 21 so as to optimize the heating of the water-based operating liquid 10 contained in the tank 4, namely in order to speed up the heating of the water-based operating liquid 10 contained in the tank 4, though without risking damaging the tank 4 or components of the tank 4. In particular, in use, the control unit 28 operates a feedback control, which acts upon the degree of opening of the feeding valve 20 based on the difference between a desired temperature of the heated air in the wrapping body 17 (which is needed to optimized the heating of the water-based operating liquid 10 contained in the tank 4) and an actual temperature (measured by the temperature sensor 21) of the air flowing in the wrapping body 17.

The water-based operating liquid 10 contained in the tank 4 could contain micro-organisms (for example bacteria or spores), namely living organisms having dimensions that are such that they are not visible to the naked eye (typically smaller than 0.1 mm). These micro-organisms can proliferate over time inside the tank 4, thus generating colonies that can, for example, (partially or completely) obstruct the intake of water-based operating liquid 10 of the pump 5 or can be sucked by the pump 5 and, hence, be sent to the injectors 7 with the risk of clogging the pump 5, possible filters arranged downstream of the pump 5, the injectors 7 or, if they reach the combustion chambers obtained in the cylinders of the internal combustion heat engine 2, jeopardize the combustion with a potential degradation of performances and/or a potential increase in the generation of polluting substances. In other words, the micro-organisms present in the water-based operating liquid 10 contained in the tank 4, over time, can proliferate and increase in number, causing, for example, the formation of algae or biofilms on the walls of the tank 4; said algae or biofilms, by detaching from the walls, can obstruct the intake of the pump 5 or can be sucked by the pump 5 and, hence, reach the injectors 7 and/or the combustion chambers obtained in the cylinders.

According to this embodiment, in use, the control unit 28 is configured to also control the heating device 9 so as to heat the water contained in the tank 4 at a temperature above 60° C. (preferably 70° C.) in order to obtain a thermal treatment (namely, a sort of sterilization/pasteurization) of the operating liquid 10 contained in the tank 4 (namely, in order to obtain, due to the heat, a reduction in the concentration of micro-organisms present in the water-based operating liquid 10 contained in the tank 4). It should be pointed out that the thermal treatment carried out using the heating device 9 is a sort of sterilization (namely, a partial, incomplete sterilization), because, since high temperatures (above 100° C.) should not be reached in order not to damage the tank 4 or the components housed in the tank 4, at the end of the thermal treatment the water contained in the tank 4 is not "sterile" in a medical sense, but it has anyway significantly reduced the presence of micro-organisms.

In other words, the control unit 28 uses (any time the internal combustion engine 2 is turned on) the heating device (initially designed only for an anti-ice function) to subject the water-based operating liquid 10 contained in the tank 4 to a thermal treatment aimed at reducing (as much as possible) micro-organisms in vegetative form, germs and, with a prolonged action, also some bacterial spores. Experimental tests have shown that, by heating the water contained in the tank 4 at 70° C.-75° C. for at least 2-5 minutes, it is possible to obtain a 90-98% reduction of the total bacterial concentration.

The wrapping body 17 further comprises an outlet opening 26, which is obtained in the area of the upper surface 19, is arranged higher than the inlet opening 25 and is configured to allow the heated air to flow outwards.

Furthermore, a filter 27 is provided, which engages the heated air outlet opening 26 and is configured to filter the heated air flowing out of the heat exchanger 15. Similarly, a filter could be provided, which engages the inlet opening 13 or is arranged upstream of the inlet opening 13 and is configured to filter the air flowing into the heating chamber 12.

The heating device 9 could further comprise an aspirator 29, which is arranged in the wrapping body 17, engages the outlet opening 26 of the wrapping body 17 and is configured to create a forced circulation of the heated air inside the wrapping body 17; alternatively or in addition to the aspirator 29 (as shown in the embodiment of FIG. 2), the heating device 9 can comprise a blower 30, which is also arranged inside the wrapping body 17, engages the inlet opening 25 of the wrapping body 17 and is configured to create, instead of or in collaboration with the aspirator 29, the aforesaid forced circulation of the heated air in the wrapping body 17. In other words, the aspirator 29 and/or the blower 30 are configured to enable the circulation of the heated air in the wrapping body 17, for example in order to allow for a uniform heating of the tank 4 (and, hence, of the water-based operating liquid 10).

In use, the heating device 9 operates in the ways described below.

According to a first mode of operation, the temperature sensor 23 detects the temperature of the water-based operating liquid 10 contained in the tank 4 and generates a corresponding electrical signal, which is transmitted to the control unit 28; in case the electrical signal indicates that a temperature of the water-based operating liquid 10 is close to the freezing temperature (for water 0° or below, for a mixture of water and urea −11° C. or below), the control unit 28 detects that the water-based operating liquid 10 is about to freeze and, therefore, controls the feeding valve 20 so as to open it.

Simultaneously with the detection of the temperature of the water-based operating liquid 10, the air flowing into the inlet opening 13 of the heating chamber 12 is heated by the exhaust gas 11 flowing in the exhaust duct 3 in the ways described above. In this way, the air contained in the heating chamber 12 is heated and conveyed towards the outlet opening 14 through convection.

Consequently, the heated air is capable of flowing towards the wrapping body 17, in particular through the inlet opening 25 thereof, since the feeding valve 20 is in the opening position; in this way, the heated air flows into the wrapping body 17 and exchanges heat with the water-based operating liquid 10 in the tank 4 in the ways described above. In other words, the heated air releases part of its heat to the water-based operating liquid 10, so as to heat and defrost it.

Subsequently, the heated air, which at least partly released its heat to the water-based operating liquid 10, is conveyed towards the outlet opening 26 of the wrapping body 17 and through the filter 27, so as to flow out of the heat exchanger 15.

It should be pointed out that the aspirator 29 and/or the blower 30 help the heated air flow into and out of the wrapping body 17.

The control unit 28 can close the feeding valve 20 in at least two cases.

In a first case, the temperature sensor 21 detects the temperature of the heated air and generates the corresponding electrical signal, which is transmitted to the control unit 28; if said electrical signal indicates that the temperature of the heated air is high (above 85-90° C.), the control unit 28 controls the feeding valve 20 so as to close it, since, in this case, the temperature is too high for the tank 4 to be capable of bearing it. In other words, the control unit 28 controls the closing of the feeding valve 20 so as to preserve the integrity of the tank 4.

Alternatively, in a second case, the control unit 28 causes the feeding valve 20 to close if the temperature sensor 23 detects a temperature of the water-based operating liquid 10 (significantly) above the freezing temperature.

In this case, the control unit 28 establishes that the water-based operating liquid 10 was defrosted and, therefore, the feeding system 1 can operate correctly.

Figure 3:
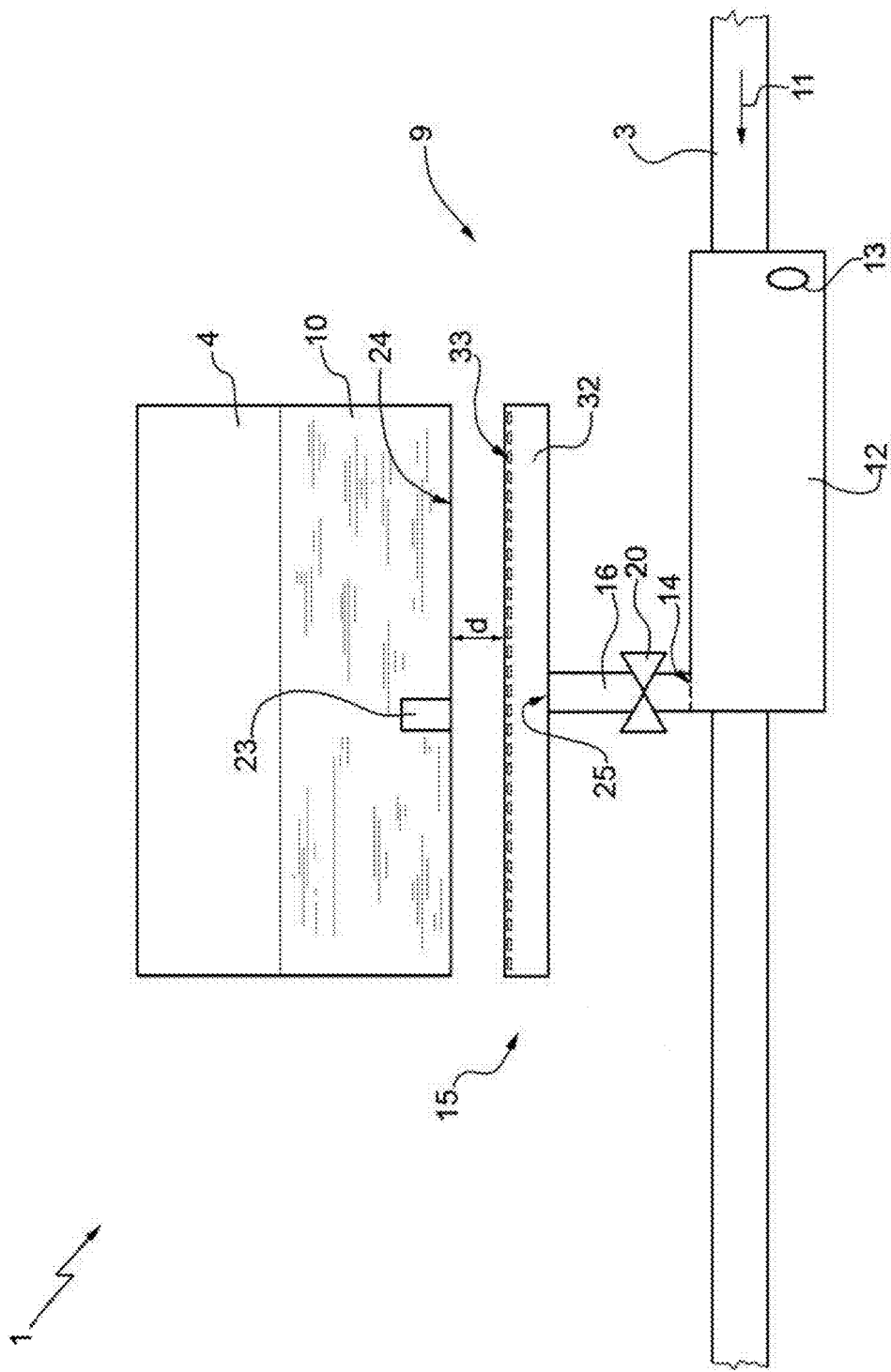
FIG. 3 is a schematic view of an alternative embodiment of the heating device of FIG. 2.

FIG. 3 shows another embodiment of the heating device 9, which is different from the embodiment shown in FIG. 2 because of the conformation of the heat exchanger 15. In the embodiment shown in FIG. 3, the heat exchanger 15 comprises, instead of the wrapping body 17, a flat diffuser 32, which is arranged under the tank 4 at a distance d from the tank 4 (in particular, from a lower surface 24 of the tank 4); in particular, the flat diffuser 32 has a plurality of outlet openings 33, which face upwards (in particular, face the lower surface 24 of the tank 4) and are configured to convey the heated air towards the tank 4 through convection.

In use, the heat exchanger 9 shown in FIG. 3 operates in a similar way to the one described with reference to FIG. 2.

More in detail, the heated air is conveyed towards the flat diffuser 32 (in particular, through the inlet opening 25 of the heat exchanger 15) by means of the feeding duct 16 and, subsequently, it flows out through said plurality of outlet openings 33; in this way, the heated air is diffused by the flat diffuser 32 towards the tank 4 and, exploiting the upward motion of the heated air, the tank 4 (and, hence, the water-based operating liquid 10 contained in the tank 4) is heated in a similar way to the one discussed for the embodiment of FIG. 2.

According to the embodiment of FIG. 3, the opening and the closing of the feeding valve 20 are solely regulated by the temperature detection carried out by the temperature sensor 23; therefore, the control unit 28 controls the feeding valve 20 based on electrical signals sent by the temperature sensor 23 and concerning the temperature of the water-based operating liquid 10, similarly to what described with reference to the embodiment of FIG. 2.

Figure 4:
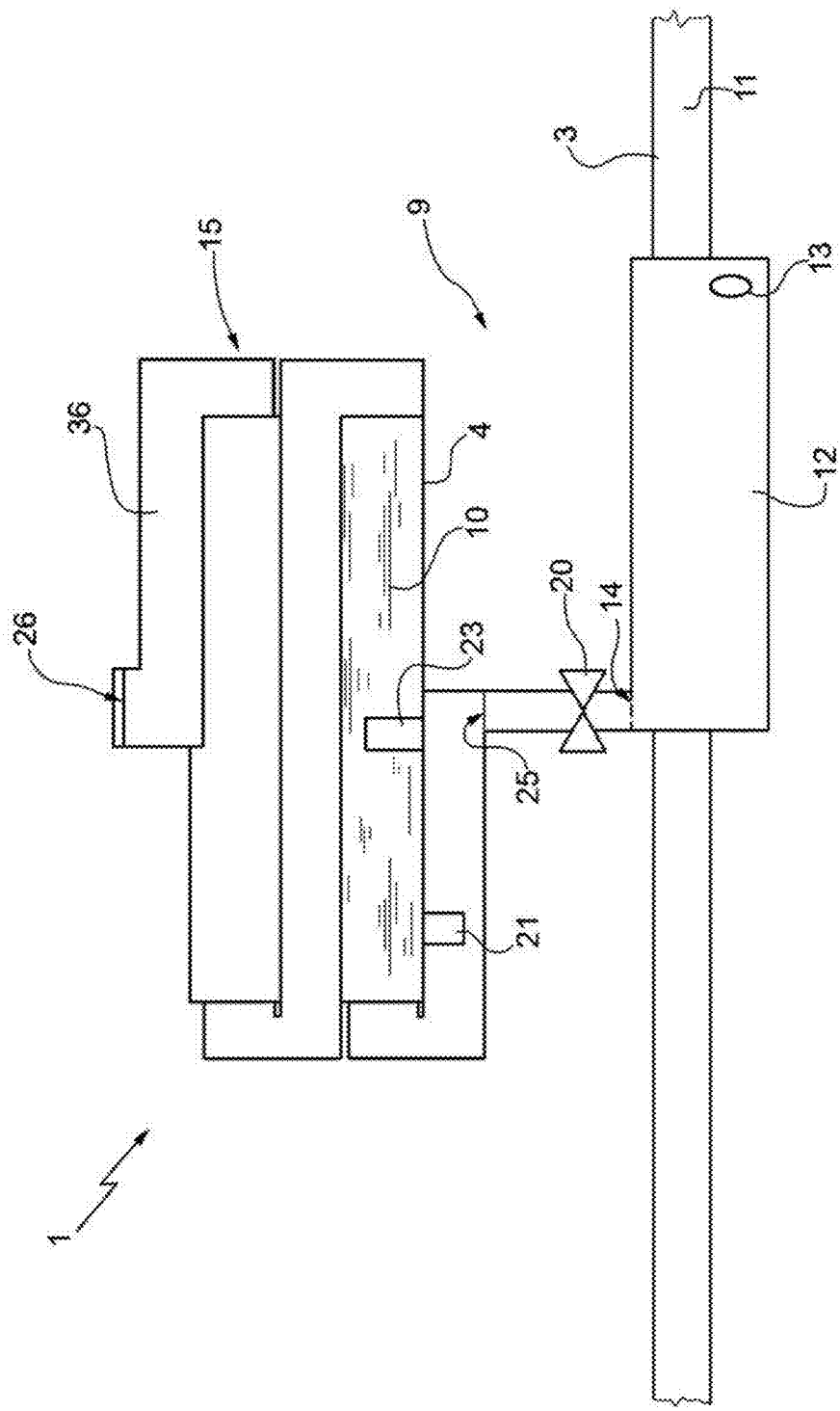
FIG. 4 is a schematic view of a further embodiment of the heating device of FIG. 2.

FIG. 4 shows a further embodiment of the heating device 9, which is different from the embodiment shown in FIG. 2 because of the conformation of the heat exchanger 15. In the embodiment shown in FIG. 3, the heat exchanger 15 comprises, instead of the wrapping body 17, a tubular body 36, which is wound in a coil shape around the tank 4 (and, therefore, partially in contact with the latter) and is configured to receive, in the area of the inlet opening 25, the heated air coming from the heating chamber 12.

In use, the heating device 9 of FIG. 4 operates in a similar way to the one discussed with reference to the heating device 9 of the embodiment of FIG. 2.

In the embodiment shown in the accompanying figures, the tank 4 contains, as water-based operating liquid 10, demineralised water, which is injected into the combustion chambers obtained in the cylinders of the internal combustion heat engine 2 so as to increase the efficiency of the combustion and/or increase the power generated.

According to a different embodiment which is not shown herein, the tank 4 contains, as water-based operating liquid 10, a water solution of urea (namely, a water-based operating liquid containing urea), which is injected along the exhaust duct 3 upstream of an SCR catalytic converter.

The embodiments described herein can be combined with one another, without for this reason going beyond the scope of protection of the invention.

The heating device 9 according to the invention has different advantages.

First of all, the heating device 9 described above prevents the water-based operating liquid 10 from freezing using the heat provided by the exhaust gases 11 flowing in the exhaust duct 3; indeed, the heat exchange between the exhaust gases 11 and the air flowing into the heating chamber 12 leads to a heating of the air, which, in turn, after having flow to the heat exchanger 15, heats the water-based operating liquid 10, thus increasing the temperature thereof. In other words, the heating device 9 according to the invention allows the heat of the exhaust gases 11 to be effectively used to ensure the correct operation of the feeding system 1 and, hence, of the internal combustion heat engine 2.

Furthermore, the heating device 9 according to the invention is simple and economic to be manufactured.

LIST OF THE REFERENCE NUMBERS OF THE FIGURES 1 feeding system
2 internal combustion heat engine
3 exhaust duct
4 tank
5 pump
6 feeding duct
7 injectors
8 maximum pressure valve
9 heating device
10 water-based operating liquid
11 exhaust gases
12 heating chamber
13 inlet opening
14 outlet opening
15 heat exchanger
16 feeding duct
17 wrapping body
17A hollow portion
18 lower surface
18A area
18B area
19 upper surface
20 adjustment valve
21 temperature sensor
23 temperature sensor
24 lower surface
25 inlet opening
26 outlet opening
27 filter
28 control unit
29 aspirator
30 blower
32 flat diffuser
33 plurality of outlet openings
36 tubular body
d distance

The invention claimed is:

1. An internal combustion engine (2) comprising:
at least one cylinder provided with a combustion chamber, in which, following the combustion, exhaust gases (11) are generated;
an exhaust duct (3), through which pass exhaust gases (11) coming from the combustion chamber; and
a water-based operating liquid system (1) including a tank (4), which is designed to contain a quantity of water-based operating liquid, a heating device (9), which is coupled to the tank (4) and is designed to heat the water-based operating liquid contained in the tank (4), and at least one injector (7) for injecting the water-based operating liquid into the combustion chamber or in the exhaust duct (3);

wherein the heating device (9) comprises a heating chamber (12), which surrounds a portion of the exhaust duct (3), and includes an inlet opening (13) designed to receive ambient air from the environment, is configured to allow heat to be transferred from the walls of the exhaust duct (3) to the ambient air received from the environment and includes an outlet opening (14) for the heated air; and wherein the heating device (9) includes a heat exchanger (15), which receives the heated air from the outlet opening (14) of the heating chamber (12) and is thermally coupled to the tank (4) so as to transfer part of the heat from the heated air to the water-based operating liquid (10) contained in the tank (4).

2. The internal combustion engine (2) according to claim 1, wherein the heating device (9) further includes an adjustment valve (20), which is interposed between the heating chamber (12) and the heat exchanger (15) and is designed to adjust the flow of heated air between the heating chamber (12) and the heat exchanger (15).

3. The internal combustion engine (2) according to claim 2, wherein:

the heating device (9) includes a first temperature sensor (21) designed to measure the temperature of the heated air flowing into the heat exchanger (15); and the feeding valve (20) adjusts the flow of heated air between the heating chamber (12) and the heat exchanger (15) depending on the temperature of the heated air detected by the first temperature sensor (21).

4. The internal combustion engine (2) according to claim 2, wherein:

the tank (4) is provided with a second temperature sensor (23), which is designed to measure a temperature of the water-based operating liquid (10) contained in the tank (4); and the feeding valve (20) adjusts the flow of heated air between the heating chamber (12) and the heat exchanger (15) depending on the temperature of the heated air detected by the second temperature sensor (23).

5. The internal combustion engine (2) according to claim 2, wherein the heating device (9) includes a feeding duct (16), which connects the outlet opening (14) of the heating chamber to an inlet opening (25) of the heat exchanger (15) and is provided with the feeding valve (20).

6. The internal combustion engine (2) according to claim 1, wherein the heat exchanger (15) includes an internally hollow wrapping body (17), which surrounds the tank (4) and in which the heated air coming from the heating chamber (12) is caused to circulate.

7. The internal combustion engine (2) according to claim 6, wherein the wrapping body (17) has a bottom wall (18) provided with an inlet opening (25) for the heated air and a top wall (19) provided with an outlet opening (26) for the heated air.

8. The internal combustion engine (2) according to claim 7, wherein the bottom wall (18) of the wrapping body (17) is inclined relative to the horizontal and has a higher area (18A), where the inlet opening (25) for the heated air is obtained, and a lower area (18B) distal from the inlet opening (25) for the heated air.

9. The internal combustion engine (2) according to claim 8, wherein the lower area (18B) of the bottom wall (18) includes a plurality of holes designed to allow possible condensate water to flow away.

10. The internal combustion engine (2) according to claim 1, wherein the heat exchanger (15) includes a flat diffuser (32), which is arranged under the tank (4) at a distance (d) other than zero from the tank (4) and has a plurality of outlet openings (33) facing upward.

11. The internal combustion engine (2) according to claim 1, wherein the heat exchanger (15) includes a tubular duct (36), which is wound in a coil around the tank (4).

12. The internal combustion engine (2) according to claim 1, wherein:

the heat exchanger (15) has an inlet opening (25) for the heated air and an outlet opening (26) for the heated air; and the heat exchanger (15) further includes at least one air filter (27), which engages the outlet opening (26) for the heated air so as to filter the heated air flowing out of the heat exchanger (15).

13. The internal combustion engine (2) according to claim 1, wherein:

the heat exchanger (15) has an inlet opening (25) for the heated air and an outlet opening (26) for the heated air placed higher than the inlet opening (25);

the heat exchanger (15) is placed higher than the heating chamber (12); and the outlet opening (26) of the heating chamber (12) is placed higher than the inlet opening (25) of the heating chamber (12).

14. The internal combustion engine (2) according to claim 1, wherein the heating device (9) includes an aspirator (29) and/or a blower (30) designed to establish a forced air circulation from the heating chamber (12) to the heat exchanger (15).

* * * * *